United States Patent [19]

Wick

[11] 4,433,128

[45] Feb. 21, 1984

[54] EMBEDDING MASS BASED UPON FAST-REACTING POLYURETHANE CASTING RESIN

[75] Inventor: Gerhard Wick, Obernburg, Fed. Rep. of Germany

[73] Assignee: Akzo NV, Arnhem, Netherlands

[21] Appl. No.: 443,739

[22] Filed: Nov. 22, 1982

[30] Foreign Application Priority Data

Nov. 27, 1981 [DE] Fed. Rep. of Germany ....... 3147025

[51] Int. Cl.$^3$ .............................................. C08G 18/18
[52] U.S. Cl. ........................................ 528/53; 528/54; 528/58; 528/60; 528/66; 528/75; 528/74.5
[58] Field of Search ........................ 528/53, 54, 58, 60, 528/66, 75; 604/29

[56] References Cited

U.S. PATENT DOCUMENTS 4,272,377 6/1981 Gerlach et al. .................. 210/321.3

FOREIGN PATENT DOCUMENTS 1375032 11/1974 United Kingdom .

*Primary Examiner*—Maurice J. Welsh
*Attorney, Agent, or Firm*—Michael J. Striker

[57] ABSTRACT

Embedding masses are disclosed on the basis of fast-reacting polyurethane casting resins, which are obtained through reaction of an aromatic polyisocyanate with a mixture of castor oil and trimethylolpropane into an NCO-group-displaying pre-adduct and polymerization of this pre-adduct with a polypropyleneglycol or a mixture of polypropyleneglycol and trimethylolpropane in the presence of small amounts of a catalyst mixture composed of dialkyl tin dicarboxylate and tertiary amine. The polyurethane casting resins can harden in seconds-fast reaction, and are therefore preferably suitable for a continuous embedding of membranes in automatic machines, particularly of membranes for artificial organs.

20 Claims, No Drawings

EMBEDDING MASS BASED UPON FAST-REACTING POLYURETHANE CASTING RESIN

BACKGROUND OF THE INVENTION

The invention concerns fast-reacting casting resin on the basis of polyurethanes, processes for their production as well as their use as embedding masses.

The previously known casting resin systems involve not only at normal but also at increased temperatures slower, often hours-long reaction or hardening times. The long reaction periods are limited through slowly proceeding addition reactions of the involved chemical raw materials, and therefore allow only a discontinuous working-up.

It is thus known from DE-OS 28 13 197 to obtain such polyurethanes by reacting an aromatic polyisocyanate with a mixture of castor oil and trimethylol propane into an NCO-group-displaying pre-adduct, and polymerizing the pre-adduct with castor oil or a mixture of castor oil and trimethylol propane. The embedding masses described in this reference distinguish by outstanding characteristics such as high hardness, colorlessness, compatibility with blood, and good working-up characteristics. They are particularly suitable for embedding of membranes such as hollow filaments, tube foils, flat foils and the like. These can be used for construction of separatory arrangements such as dialysators, particularly hemodialysators.

Further such polyurethane embedding masses are known from DE-OS 28 55 243, which discloses as aromatic polyisocyanate 4,4'-diphenylmethane-diisocyanate with a content from 18–22 mol-% dimerised and trimerised diisocyanate, and from DE-OS 29 07 501, in which is described an aromatic polyisocyanate with 10–15 mol-% 3-isocyanatomethyl-3,5,5-trimethylcyclohexylisocyanate. These embedding masses distinguish through good storage ability and viscosity characteristics (DE-OS 28 55 243) or through high adhesive strength (DE-OS 29 07 501).

Since now a need exists for such casting resins, which allow hardening within shorter time periods or in continuous processes, whereby particularly the time period up to mold release of the embedding masses is significant, attempts have been made to harden these polyurethanes catalytically.

Thus, e.g. in German patent application P 30 10 030.2-44 embedding masses on the basis of polyurethane compositions from the above mentioned DE-OS 28 13 197, 28 55 243, and 29 07 501 are described, which are hardened with dialkyl tin compounds as catalyst. Through these measures it became possible to shorten the time period up to mold release of the embedded membranes to 20 minutes (with a working-up temperature of 50° C.). Thus, these masses, in connection with a favorable chronological viscosity behavior of the masses during the polymerization, are also suitable for the embedding of membranes in automatic casting machines.

Finally, in DE-OS 24 38 197 there are described polyurethanes which are produced through reaction of an aromatic diisocyanate with a hydroxyl group-containing polymer into a NCO-group-displaying pre-adduct, and polymerization of the pre-adduct with a lower molecular diol in the presence of water and a combination of an organo tin compound and a tertiary amine as catalyst. Therewith both of the catalysts are not added directly as mixture to one of the polymerization components, but are provided initially separated in each one of the components. According to the test examples, which are provided for closer illustration in DE-OS 24 38 197, there results thus with dibutyl tin dilaurate and 1,4-diazabicyclo(2,2,2)-octane in weight ratio 3:1 and a portion of this mixture of 0.2% by weight, relative to the total polyurethane, with a preferred hardening temperature of 50° C., a polyurethane which can be released from the mold after a period of about 1 minute. Involved herewith, though, is a polyurethane foam.

In order to be able to work up polyurethanes, particularly compact embedding masses, more economically in automatic casting machines, casting resins are required which, after the mixing of the NCO-group-displaying pre-adduct ("macroisocyanate"; "hardener") and the polyol ("chain-lengthener") reactant can be removed from the mold within still shorter time periods.

SUMMARY OF THE INVENTION

It is therefore an object of the present invention to improve a process for the production of polyurethane embedding masses of the above described type with favorable characteristics and more extensive usefulness by still shorter working-up times and particularly to arrange the working-up in automatic casting machines more economically, whereby the catalyst portion should be held as low as possible.

This object is attained according to the present invention by an embedding mass of polyurethanes, composed of a polyurethane which has been obtained through reaction of an aromatic polyisocyanate with a mixture of castor oil and trimethylolpropane into an NCO-group-displaying pre-adduct, and polymerization of the pre-adduct with a polypropyleneglycol or a mixture of polypropyleneglycol and trimethylolpropane, in the presence of catalyst, and which is thereby characterized in that the embedding mass contains as catalyst about 0.005 up to 0.3% by weight, relative to the total weight of the polyurethane resin, of a mixture of a dialkyl tin dicarboxylate and an aliphatic mono- or diamine in weight ratio 1:1 up to 4:1, and that the employed polypropyleneglycol is constructed of 25 up to 50 propylene oxide units.

It was not to be expected with knowledge of the results obtainable according to the above mentioned DE-OS 24 38 197, to obtain polyurethane form masses with mixtures of such catalysts, which can be removed from the mold within still shorter periods or with still smaller portions of catalyst mixture to obtain at least similarly favorable results.

It was thus even more surprising that according to the present invention with such catalysts in substantially smaller portions, under the conditions which will be more closely described below, not only comparable but still substantially shorter removal from the mold times than according to DE-OS 24 38 197 result.

The dialkyl tin dicarboxylate used as catalyst component in the embedding mass according to the present invention is preferably dibutyl tin diacetate, dibutyl tin dilaurate, dibutyl tin dioctoate, dibutyl tin dinonanoate or dioctyl tin dilaurate.

The tertiary aliphatic mono- or diamine used as catalyst component in the embedding mass according to the present invention is preferably trimethylamine, ethyldimethylamine, diethylmethylamine, triethylamine, N,N-dimethyl-2-phenylethylamine, N,N,N',N'-tetramethylmethanediamine, N,N,N',N'-tetramethylbutane-1,3-diamine, N-methylmorpholine, N,N-dimethylcyclohexylamine, N,N-diethylcyclohexylamine, 1,4-diazabicyclo(2,2,2)-octane, 1,8-diazabicyclo(5,4,0)-undecen-(7),1,2,4-trimethylpiperazine or dimethylaminoethylpiperazine.

The catalyst mixture contains the components dialkyl tin dicarboxylate and tertiary aliphatic amine preferably in weight ratio 2:1 up to 3.5:1.

Preferred amounts of the catalyst mixture are portions from 0.02 to 0.15% by weight, relative to the total weight of the polyurethane resin.

The molecular weight of the polypropyleneglycol employed as polymerisation component influences the reaction velocity: lower molecular weights accelerate, higher molecular weights slow down the polyurethane formation reaction. Lower molecular weights lead to harder, elasticity-poor products, higher molecular weights lead to softer, elastic polyurethanes. Preferred are polypropyleneglycol with 33 up to 44 propylene oxide units. Very good results are obtained with polypropylene glycols with about 40 propylene oxide units.

Polyethyleneglycols are less suitable, since the polyurethane casting resin produced therewith leads to relatively high swelling values in water, which is unfavorable for the use of the produced embedded membranes. Polybutylene glycols (polytetrahydrofurans), on account of their melting range (40° to 50° C.), are not available at room temperature as liquid polymerization component.

For production of such embedding masses from polyurethanes, there serves a process for the reaction of an aromatic polyisocyanate with a mixture of castor oil and trimethylolpropane into an NCO-group-displaying pre-adduct, and polymerization of the pre-adduct with a polypropyleneglycol or a mixture of polypropyleneglycol and trimethylolpropane in the presence of catalyst, which is thereby characterized in that one uses as catalyst 0.005 up to 0.3% by weight, relative to the total weight of the polyurethane resin, of a mixture of a dialkyl tin dicarboxylate and a tertiary aliphatic mono- or diamine in weight ratio 1:1 to 4:1, and that as polypropyleneglycol a product constructed from 25 up to 50 propylene oxide units is employed.

The hardening of the polyurethane embedding masses according to the present invention proceeds very quickly at room temperature or higher temperatures, e.g. 50° C.

The production of these embedding masses takes place substantially according to processes as are described in DE-OS 28 13 197, 28 55 243 and 29 07 501, whereby the main difference according to the present invention is the addition of the catalyst mixture and the polypropyleneglycol. The catalyst mixture is always added to the polypropyleneglycol or the mixture of polypropyleneglycol and trimethylolpropane serving as polymerization component. A precise dosaging of the addition is essential. With the embedding masses according to the present invention, practically all desired hardening or removal from mold periods, starting from seconds up to hours, can be adjusted.

The embedding masses according to the present invention are very suitable for embedding processes which work according to the casting principle, above all for the centrifuge casting technique. They are particularly suitable, though, for embedding processes with automatic casting machines.

The embedding masses according to the present invention have clear appearance and display good mechanical characteristics. With customary liquids, with which they come into contact during use, they are not at all or only negligibly corroded, so that no danger exists that undesired substances become extracted, and in the case of a use of these embedding masses for the embedding of separatory membranes, get led into the dialysate or retentate.

The embedding masses according to the present invention are therefore in more outstanding manner suitable as embedding masses for membranes, particularly for the embedding of membranes in artificial organs. They serve mainly for the embedding of membranes such as hollow filaments, tube foils or flat foils. In this manner embedded membranes are advantageously used in selectively working dialysators, particularly in selectively working hemodialysators, as well as in such apparatus serving for the detoxification of blood.

It is moreover favorable that, whether or not the hardening periods with the processes according to the present invention are substantially shorter than with a manner of operation without catalyst addition, a temperature increase occur only to a small extent, which is particularly advantageous for the embedding of delicate membranes. The embedding masses serve accordingly advantageously also for the embedding of temperature-sensitive membranes.

On account of the outstanding viscosity behavior during the embedding, the embedding masses are also very well suitable for embedding processes which operate according to the casting principle, particularly according to the centrifuge casting technique. The embedding masses distribute very quickly about the membranes to be embedded, on account of their outstanding viscosity behavior, filling all of the space and allowing no cavities to arise. The wetting of the membranes with the embedding mass is excellent. An undesirable, too high rise of the embedding mass as a result of capillary forces into the membranes does not occur. The embedding masses do not tend to form bubbles.

More particularly suitable, though, are the embedding masses according to the present invention for the automatic embedding of membranes based upon their amazingly fast hardening and the favorable chrolonogical viscosity behavior. Therewith the membranes to be embedded can be removed from the mold in a matter of seconds, whereby a more economical, continuously running operation is guaranteed.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

Example 1

Production of the pre-adduct without catalyst 1537.3 g (10.75 Val) liquid polyisocyanate based upon 4,4'-diphenylmethanediisocyanate (Commercial product Isonate 143 L; containing 25% by weight dimerized, trimerized and polymerized diisocyanate) are poured into a reactor and under stirring and nitrogen throughput heated at 60°–70° C. until a clear solution is present.

In a second reactor, successively 309.6 g (0.9 Val) castor oil and 58.2 g (1.3 val) trimethylolpropane are added under stirring and nitrogen throughput, and stirred for about 1 hour at 85° C. Then the heating is cut off, whereupon it must be observed that the temperature does not sink below 60° C.

The clear dissolved content of the second reactor is then within one hour allowed to flow into the liquid polyisocyanate preheated to 65° C., under stirring and nitrogen throughput. Through cooling the temperature during the reaction is held to about 70° C.

After the addition of the trimethylolpropane-castor oil solution, the reaction mixture is held for still 2 hours at 70°–75° C. The mixture should then display an isocyanate content of 18.85% by weight.

The prepared pre-adduct is finally cooled down to a temperature of 60° C., degasified through evacuation under slow stirring, and discharged by immersion filling into a dry container, rinsed with nitrogen, and is thus directly suitable for production of the embedding mass.

Example 2

Production of the catalyst-containing polymerizer 4612.5 g (5.27 Val) polypropyleneglycol with a molecular weight of 2500 (commercial product Pluracol TP 2540) and 156.6 g (3.5 val) trimethylolpropane are placed in a reactor and stirred for 1 hour at 70° up to 80° C. interior temperature, until a clear solution appears.

Then the catalyst mixture is dissolved in a beaker glass in 200 g (0.23 Val) polypropyleneglycol under mild heating at about 50° C. and under stirring, and the entire polymerizer solution is added. In order to adjust e.g. a reaction or hardening time upon the later mixing of the pre-adduct with the polymerizer of 2 minutes at 25° C., 47.4 mg dibutyl tin dilaurate (DBSnDL) and 15.8 mg 1,4-diazabicyclo(2,2,2)-octane (DABCO) must be added.

After cooling of the clear, well stirred mixture to temperatures below 50° C., it is degasified through evacuation under slow stirring, and discharged by immersion filling into a dry, nitrogen rinsed container.

The polymerizer is thus directly usable for the polymerization of the pre-adduct.

Examples 3–9

Casting resin production with DBSnDL and DABCO in weight ratio 3:1

For the casting resin production always 1 part by weight of the pre-adduct prepared according to Example 1 and 2 parts by weight of the polymerizer prepared according to Example 2 are mixed.

The measuring of the reaction velocity follows through determination of the gelation period according to DIN-specification 16945 and refers always to 50 g amounts. Gelation period and removal from the mold period are practically the same with short gelation periods (such as e.g. in the case of Examples 3–5).

There were produced casting resin mixtures with different portions of catalyst mixture (DBSnDL and DABCO in weight ratio 3:1) and the individual gelation periods determined at 25° C. and at 50° C. The corresponding results are set forth in Table 1.

TABLE 1

Gelation periods at 25° C. and 50° C. of casting resin mixtures with different portions of catalyst mixture (DBSnDL and DABCO in weight ratio 3:1)

| Example | Portion of catalyst mixture* (ppm) | Gelation period (sec) 25° C. | Gelation period (sec) 50° C. |
|---|---|---|---|
| 3 | 851 | 40 | ≦30** |
| 4 | 638 | 90 | 30 |
| 5 | 425 | 120 | 45 |
| 6 | 212 | 240 | 60 |
| 7 | 106 | 360 | 120 |
| 8 | 53 | 900 | 360 |
| 9 | 44 | 1200 | 480 |

*relative to the total casting resin
**gelation times under 30 sec are practically no longer measurable Examples 10–13

Casting resin mixtures were prepared, as described in Examples 1–9, with the distinction that the ratio of DBSnDL and DABCO is varied. The portion of catalyst mixture in the entire casting resin amounts therewith to 0.06% by weight. The obtained gelation times are summarized in Table 2.

TABLE 2

Gelation periods at 25° C. and 50° C. of casting resin mixtures with different weight ratios DBSnDL:DABCO (weight portion of the catalyst mixture: 0.06%, relative to the casting resin)

| Example | weight ratio DBSnDL:DABCO | gelation period (sec) 25° C. | gelation period (sec) 50° C. |
|---|---|---|---|
| 10 | 1:1 | 105 | 35 |
| 11 | 2:1 | 105 | 35 |
| 12 | 3:1 | 80 | 3 |
| 13 | 4:1 | 120 | 40 |

Examples 14–16

In the test examples 14–17 the efficiency of other dialkyl tin salts instead of dibutyl tin dilaurate in the catalyst mixture is demonstrated. The portion of catalyst mixture in the total casting resin amounts to 0.06% by weight. The weight ratio of dialkyl tin salt and DABCO is 3:1.

Casting resin and casting resin components are prepared as set forth in Examples 1–3. The results are set forth in Table 3.

TABLE 3

Gelation periods at 25° C. and 50° C. with different dialkyl tin salts as catalyst component (weight ratio dialkyl tin salt and DABCO = 3:1; portion of catalyst mixture: 0.06% by weight, relative to the casting resin)

| Example | dialkyl tin salt | gelation periods (sec) 25° C. | gelation periods (sec) 50° C. |
|---|---|---|---|
| 14 | dibutyl tin diacetate | 115 | 38 |
| 15 | di-n-butyl tin dinonanoate | 115 | 38 |
| 16 | di-n-octyl tin dilaurate | 155 | 50 |
| Comparison (12) | di-n-butyl tin dilaurate | 80 | 30 |

Examples 17–22

Casting resin mixtures are prepared as described in Examples 1–3. However, with constant portion of the catalyst mixture (0.06% by weight, relative to the casting resin), other cyclical tertiary amines instead of DABCO are employed as catalyst. The weight ratio of DBSnDL and cyclical tertiary amine is therewith always 3:1 and 1:1.

The gelation periods obtained with these casting resins are set forth in Table 4.

TABLE 4

Gelation periods at 25° C. and 50° C. with different cyclical tertiary amines as catalyst component (weight ratio DBSnDL: cyclical tertiary amine = 3:1 and 1:1; portion of catalyst mixture: 0.06% by weight, relative to the casting resin)

| Example | cycl. tert. amine | weight ratio DBSnDL:Tert. amine | gelation periods (sec) 25° C. | 50° C. |
|---|---|---|---|---|
| 17 | N,N'—dimethyl- cyclohexylamine | 3:1 | 100 | 35 |
| 18 | | 1:1 | 120 | 40 |
| 19 | N—methyl-mor- pholine | 3:1 | 165 | 50 |
| 20 | | 1:1 | 180 | 55 |
| 21 | diazabicyclo- undecene | 3:1 | 90 | 40 |
| 22 | | 1:1 | 110 | 45 |
| 11 | DABCO | 3:1 | 80 | 30 |
| 9 | | 1:1 | 105 | 35 |

Example 23

Continuous embedding of hollow filament membranes with a two-component dosing and mixing apparatus Description of the apparatus:

On a base plate are mounted two gear pumps, which can be adjusted with the individual drive motors to the previously described mixing ratio of both components. Both of the components are separated from temperable supply containers with the aid of the described gear pumps and led into a mixing chamber. The mixing chamber contains static mixing elements, which provide for a homogeneous mixture of the dosed components. After the finish of the casting operation, the mixing chamber is cleaned with the aid of solvents.

Casting operation:

The pre-adduct prepared according to Example 1, with a viscosity of 22 Pa.s at 20° C. is placed into a supply container for this purpose. Likewise, the polymerizer prepared according to Example 2, with a viscosity of 0.76 Pa.s at 20° C. is placed in the second supply container. With the aid of the gear pumps, the drives of which are adjusted to a mixing ratio of 1:2, pre-adduct and polymerizer are separately led into the tube-shaped, temperable mixing chamber, which contains 19 static mixing elements. The clear, mixed, bubble-free casting resin processes at 25° C. an initial viscosity of 2.2 Pa.s and at 60° C. of 0.7 Pa.s. It is allowed to flow directly into a prepared form, in which the casting resin sets at room temperature within the shortest time period. The reaction velocity can be accelerated through heating of the shape, so that seconds-fast removal from the mold is possible. For the Shore-A-hardness of the casting resin, after 1 hour the value 64 and after 17 hours the value 75 are determined. The freezing range (glass point) of the casting resin mixture lies between −35° C. and −8° C.

It will be understood that each of the elements described above, or two or more together, may also find a useful application in other types of polyurethane masses differing from the types described above.

While the invention has been illustrated and described as embodied in an embedding mass of the basis of fast-reacting polyurethane casting resin, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. Embedding mass based upon polyurethanes produced from castor oil, comprising a polyurethane, which has been obtained through reaction of an aromatic polyisocyanate with a mixture of castor oil and trimethylolpropane to produce an NCO-group-displaying pre-adduct and polymerization of the pre-adduct with a polypropyleneglycol or a mixture of polypropyleneglycol and trimethylolpropane in the presence of catalyst, said embedding mass containing as catalyst about 0.005 up to 0.3% by weight, relative to the total weight of the polyurethane resin, of a mixture of a dialkyl tin dicarboxylate and a tertiary aliphatic mono- or diamine in weight ratio 1:1 up to 4:1, said employed polypropylene glycol being constructed of 25 up to 50 propylene oxide units.

2. Embedding mass according to claim 1, wherein the catalyst mixture contains as dialkyl tin dicarboxylate, dibutyl tin diacetate, dibutyl tin dilaurate, dibutyl tin dioctoate, dibutyl tin dinonanoate or dioctyl tin dilaurate.

3. Embedding mass according to claim 1, wherein the catalyst mixture contains as tertiary aliphatic mono- or diamine, trimethylamine, ethyldimethylamine, diethylmethylamine, triethylamine, N,N-dimethyl-2-phenylethylamine, N,N,N',N'-tetramethylmethanediamine, N,N,N',N'-tetramethylbutane-1,3-diamine, N-methylmorpholine, N,N-dimethylcyclohexylamine, N,N-diethylcyclohexylamine, 1,4-diazabicyclo(2,2,2)-octane, 1,8-diazabicyclo(5,4,0)-undecene-(7), 1,2,4-trimethylpiperazine or dimethylaminoethylpiperazine.

4. Embedding mass according to claim 1, wherein in the catalyst mixture, dialkyl tin dicarboxylate and tertiary aliphatic mono- or diamine are employed in weight ratio 2:1 up to 3.5:1.

5. Embedding mass according to claim 1, wherein the catalyst mixture is provided in amounts of 0.02 up to 0.15% by weight, relative to the total weight of the polyurethane resin.

6. Embedding mass according to claim 1, wherein the polypropyleneglycol is constructed from 33 up to 44 propylene oxide units.

7. Process for the production of an embedding mass of polyurethane, comprising reacting an aromatic polyisocyanate with a mixture of castor oil and trimethylolpropane to produce an NCO-group-displaying pre-adduct and polymerizing said pre-adduct with a polypropyleneglycol or a mixture of polypropyleneglycol and trimethylolpropane, in the presence of catalyst, using as catalyst 0.005 to 0.3% by weight, relative to the total weight of the polyurethane resin, of a mixture of a dialkyl tin dicarboxylate and a tertiary aliphatic monoor diamine in weight ratio 1:1 up to 4:1, and using as polypropyleneglycol a product constructed from 25 up to 50 propylene oxide units.

8. Process according to claim 7, using as dialkyl tin dicarboxylate in the catalyst mixture, dibutyl tin diacetate, dibutyl tin dilaurate, dibutyl tin dioctoate, dibutyl tin dinonanoate or dioctyl tin dilaurate.

9. Process according to claim 7, using as tertiary aliphatic mono- or diamine in the catalyst mixture, trimethylamine, ethyldimethylamine, diethylmethylamine, triethylamine, N,N-dimethyl-2-phenylethylamine, N,N,N',N'-tetramethylmethane diamine, N,N,N',N'-tetramethylbutane-1,3-diamine, N-methylmorpholine, N,N-dimethylcyclohexylamine, N,N-diethylcyclohexylamine, 1,4-diazabicyclo(2,2,2)-octane, 1,8-diazabicyclo(5,4,0)-undecene-(7), 1,2,4-trimethylpiperazine or dimethylaminoethylpiperazine.

10. Process according to claim 7, wherein dialkyl tin compound and tertiary alkylamine are mixed in weight ratio 2:1 up to 3.5:1.

11. Process according to claim 7, wherein said catalyst mixture is employed in amounts from 0.02 up to 0.15% by weight, relative to the total weight of the polyurethane resin.

12. Process according to claim 7, wherein for polymerization of the pre-adduct, a polypropyleneglycol is used which is constructed from 33 up to 44 propylene oxide units.

13. Process according to claim 7, wherein the hardening of the embedding mass is performed at room temperature.

14. In a process of embedding of membranes in the form of hollow filaments, tube foils or flat foils for construction of separatory arrangements of the type in which an embedding mass is distributed about the membranes to be embedded and then hardened, the improvement wherein employing an embedding mass based upon polyurethanes according to claim 1.

15. Improved process according to claim 14, for construction of artificial organs.

16. Improved process according to claim 14, for construction of selectively working dialysators.

17. Improved process according to claim 16, for construction of selectively working hemodialysators.

18. Improved process according to claim 14, wherein said embedding mass is distributed about the membranes and then hardened by casting.

19. Improved process according to claim 18, wherein said embedding mass is distributed about the membranes and then hardened by centrifuge casting.

20. Improved process according to claim 18, for continuous embedding of membranes by automatic casting machines.

* * * * *